United States Patent [19]

Hansch

[11] 4,191,473
[45] Mar. 4, 1980

[54] METHOD OF AND APPARATUS FOR MEASURING THE ABSOLUTE WAVELENGTH OF A SOURCE OF UNKNOWN FREQUENCY RADIATION

[76] Inventor: Theodor W. Hansch, 15100 Oak Creek Dr., Apt. 405, Palo Alto, Calif. 94304

[21] Appl. No.: 837,017

[22] Filed: Jan. 9, 1978

[51] Int. Cl.² ............ G01J 3/02; G02B 5/18
[52] U.S. Cl. ............ 356/300; 350/3.70; 350/162 R; 356/328
[58] Field of Search ............ 350/3.70/, 162 R; 356/300, 302, 303, 305, 306, 328, 74, 76, 77, 79

[56] References Cited

U.S. PATENT DOCUMENTS

| | | | |
|---|---|---|---|
| 3,171,882 | 3/1965 | Baird | 356/306 |
| 3,359,850 | 12/1967 | Baird | 356/306 |
| 3,523,734 | 8/1970 | Brehm et al. | 350/162 R X |
| 3,653,765 | 4/1972 | Hearn | 350/306 |
| 3,791,737 | 2/1974 | Johansson | 350/162 R X |

*Primary Examiner*—F. L. Evans
*Attorney, Agent, or Firm*—Paul B. Fihe

[57] ABSTRACT

The invention constitutes a method of and apparatus for measuring the absolute wavelength of a source of unknown frequency radiation through directing radiant energy of known frequency against a diffraction grating of predetermined pattern so as to image a calibrated scale on a suitable screen or the like, and then directing the radiant energy from the unknown frequency source along the same path to the diffraction grating and onto the screen, where a visually available easy-to-read measurement of the wavelength appears.

13 Claims, 2 Drawing Figures

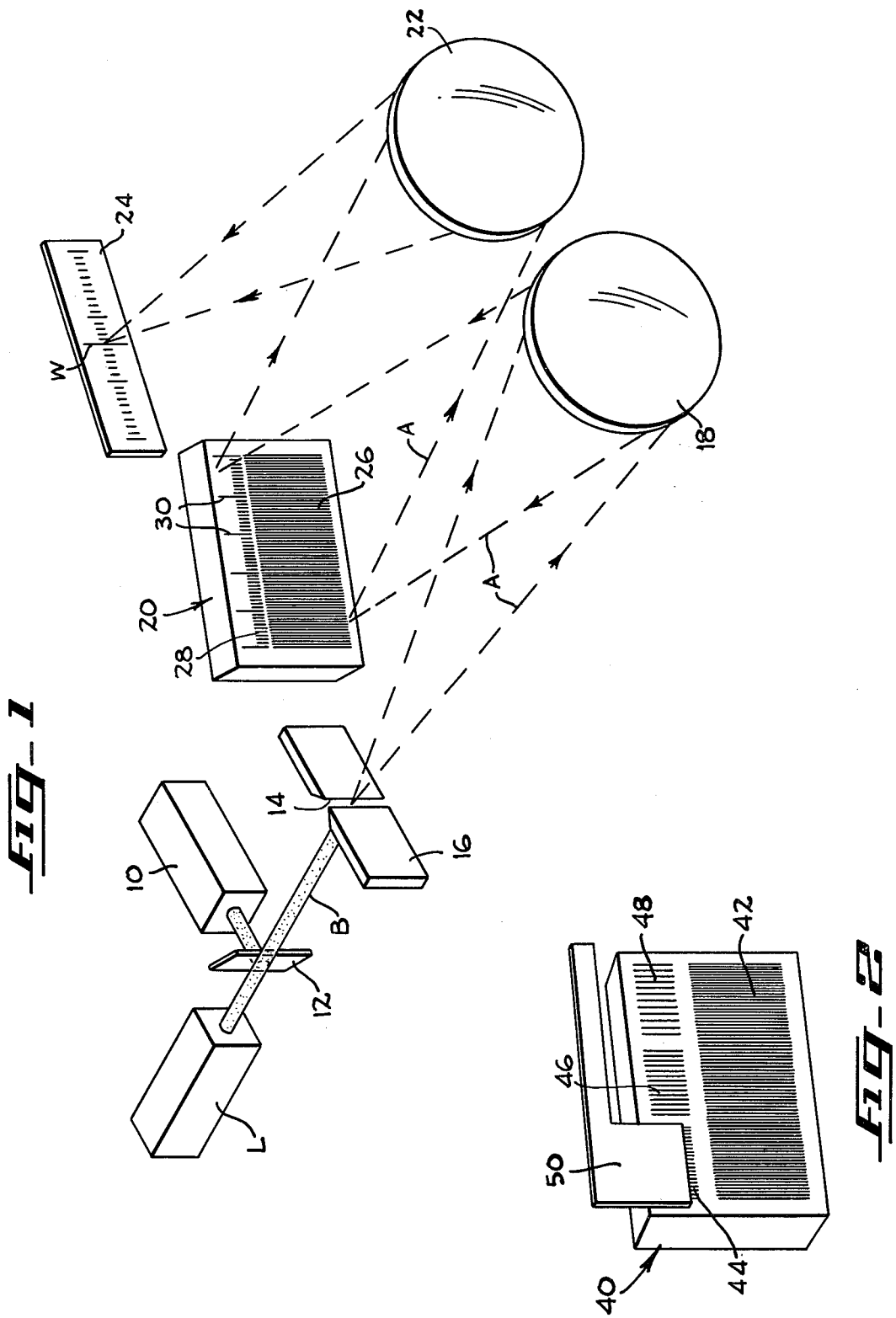

METHOD OF AND APPARATUS FOR MEASURING THE ABSOLUTE WAVELENGTH OF A SOURCE OF UNKNOWN FREQUENCY RADIATION

FIELD OF THE INVENTION

The present invention relates generally to the determination of the wavelength or frequency of a source of radiant energy, and more particularly to a method of and apparatus for measuring the wavelengths or frequency spectrum of a source of unknown frequency radiation.

BACKGROUND OF THE INVENTION

Grating spectrographs have been utilized for a number of years to make the absolute measurements of wavelength and to study the structure and intensity of spectral lines of various sources of radiant energy, and have been extremely refined since the earliest experiments by Thomas Young in the early 19th century, which demonstrated the interference effects of light and other radiant energy. At the present time, a conventional high resolution grating spectrograph can measure, for example, the wavelength of a laser to within 0.01 A°, however with the absolute calibration only being achieved with the help of spectral lamps and wavelength catalogs, which is, at best, a tedious procedure.

Recently, for determining the absolute wavelength of continuous-wave lasers, interferometers such as described by Kowalski, Hawkins, and Schawlow in the Journal of the Optical Society of America, Vol. 66, 965(1976) have been very effective, but such interferometers do not accommodate themselves to the wavelength measurement of pulsed lasers, which do not permit the easy counting of large numbers of the interferometric fringes.

SUMMARY OF THE PRESENT INVENTION

Accordingly, it is the general objective of the present invention to provide a method of and apparatus for measuring the absolute wavelength or wavelengths of a source of unknown frequency radiation which permits a rapid, convenient and accurate wavelength readout. Generally, such objective is achieved by appropriately directing energy from a radiation source of known wavelength (frequency) such as a reference laser to a diffraction grating having a predetermined grating pattern so that the reflected or transmitted radiation from the diffraction grating can thereafter be directed to an imaging device such as a simple imaging screen, to provide thereon an easy-to-read, decimal, ruler-like, calibrated, absolute wavelength scale. In turn, the source of unknown frequency (wavelength) radiation is directed against the same diffraction grating in a similar fashion to provide an imaged spectral line or lines on the existent calibrated scale so that a very convenient readout of the unknown wavelength relative to the established reference wavelength is readily provided.

In order to generate the wavelength scale, the diffraction grating can include special multiple rulings whose length, width, phase or other characteristics may vary. In particular, in this way the grating can be arranged to produce ruler-like patterns which are, for instance, directly calibrated in angstroms or nanometers, further facilitating the immediate readout of the unknown wavelength. In addition, diffraction gratings generated by holographic techniques can include not only a predetermined wavelength scale as mentioned hereinabove, but can include labels, numbers, letters or the like, to further enhance the readout facility, and the readout or imaging means can take, in addition to the form of a simple visual screen, known readout mechanisms utilizing photographic, photodetector, or electronic scanning techniques in accordance with presently known technology.

BRIEF DESCRIPTION OF THE DRAWINGS

The stated objective of the invention and the manner in which it is achieved as summarized hereinabove will be more readily understood by reference to the following detailed description of the exemplary structures shown in the accompanying drawing wherein:

FIG. 1 is a diagrammatic perspective view of an apparatus for measuring the absolute wavelength of a laser in accordance with the present invention, and FIG. 2 is a view of a modified form of diffraction grating that can be utilized in accordance with the method and apparatus disclosed in connection with FIG. 1.

DETAILED DESCRIPTION OF THE EXEMPLARY EMBODIMENT OF THE INVENTION

With initial reference to the diagrammatic illustration of FIG. 1, a reference source of radiation 10 of known wavelength (frequency) is arranged to direct a monochromatic beam B of radiant energy towards an angularly disposed beam-splitter 12 so that a portion of the reference source energy is directed to and through an entrance slit 14 formed in a plate 16 so that the resultant dispersive energy is directed towards a concave mirror 18 which in turn redirects the radiant energy in parallel ray paths against a diffraction grating 20, to be described in detail hereinafter, for reflection to a second concave mirror 22 which in turn redirects the reflected energy to an imaging screen 24, the ray paths being indicated by the arrows A.

In the present instance, the reference source of radiation 10 constitutes a He-Ne-laser of exactly known wavelength and the diffraction grating 20 is formed generally in a conventional fashion by precise ruled lines or grooves on a metal plate, but in a particular fashion so as to impose upon the imaging screen an easy-to-read ruler-like absolute wavelength scale.

While but a limited number of diffraction grooves or lines are illustrated on the grating, it will be understood that, for example, 2,000 grooves per millimeter are formed in parallelism in one area 26 on a polished blank in a generally conventional fashion. In a second area 28, additional grooves with a spacing of 200 grooves per millimeter are formed. However, the length of the grooves is limited to leave a margin of, for example, one inch width at their extremities, but by appropriate control of the ruling stylus, every tenth groove of this grating is extended about one quarter of an inch into the margin, thus producing an auxiliary grating 30 with exactly a ten times greater grating constant. In turn, while not illustrated, every one-hundredth groove is extended still further, for example one-half inch into the margin, to provide an auxiliary grating with a spacing of 20 grooves per millimeter, and additional extensions can be ruled every one thousand and perhaps every ten thousand grooves, thus to provide in effect a ruled grating which is quite similar to the calibration lines of a conventional decimal ruler. Because of such predetermined grating pattern on the diffraction grating, the energy from the known frequency laser source is projected onto the imaging screen in a regular pattern corresponding in turn to the appearance of a decimal ruler, it being understood that the gratings with the finest ruling lines or grooves produce the coarsest calibration lines on the imaging screen, and vice versa.

In order to determine the precise wavelength (frequency) of a radiation source whose frequency and wavelength are unknown, such source, here indicated as a laser L, is disposed to direct energy through the beam-splitter 12 and thereafter along the same path through the slit 14, the mirrors 18, 22, and grating 20, to the imaging screen 24 so as to produce a line as indicated at W on the existent calibration scale so that a direct and precise readout of the wavelength or frequency spectrum, as the case may be, of the unknown source can be visually ascertained.

First, it will be apparent that the imaging means 24 herein illustrated as a simple screen can take many alternate and more sophisticated forms, well known in the general field of spectrographic grating devices. For example, the imaging means can constitute a photographic detector, a photodetector which provides for a mechanical scan of the grating, an electronic scanning mechanism such as a TV camera, or a diode array, or any other techniques well known in this art.

Additionally, it will be obvious to those skilled in the art that the diffraction grating, with somewhat more sophisticated ruling procedures, can for a given reference laser wavelength, produce ruler-like patterns on the imaging mechanism which are directly calibrated in angstroms or nanometers to further facilitate ease of the readout, and furthermore, gratings can be formed by recently developed holographic procedures providing a superimposed hologram of a wavelength scale including, if desired, indicia such as numbers or letters to yet further facilitate the readout operation.

As one specific alternative that has been utilized, a grating 40 shown in FIG. 2 incudes one area 42 having 1,800 lines or grooves per millimeter and has been partially stripped to accommodate three auxiliary gratings 44, 46 and 48, with two-inch long rulings of 58, 5.8 and 0.58 lines or grooves per millimeter, it again being understood that the greater groove spacing on the grating provides more precision in the ultimate image or calibration scale on the imaging device. In the mentioned specific embodiment shown in FIG. 2, the grating grooves or lines are illuminated through a ten micrometer wide entrance slit, and since the rulings can produce too much intensity, a mask 50 can be placed to partially cover certain of the gratings and limit the intensity on the imaging screen.

It should be explained that the variance in the line or groove length in the diffraction grating of FIG. 1 and FIG. 2 has been used to provide for clarity of the readout mechanism, but other variations in the grating can be utilized to provide a similar effect. By way of example, although not shown, the width of the grooves in grating can be varied, or certain grooves can be skipped or laterally displaced at predetermined intervals.

It will be apparent that other variations and/or modifications in the structure and method as described can be envisioned within the spirit of the present invention, and the foregoing description of two embodiments accordingly is to be considered as purely exemplary and not in a limiting sense, and the actual scope of the invention is to be indicated only by reference to the appended claims.

What is claimed is:

1. Apparatus for measuring the absolute wavelength of a source of unknown frequency radiation which comprises
    a diffraction grating having a predetermined grating pattern with periodic variations in at least some of its grating lines and arranged to receive radiation from the radiation source,
    a reference source of radiation of known wavelength (frequency) arranged to direct its radiation against said diffraction grating, and
    means for imaging the diffracted radiation from both sources, the imaged radiation from said reference source providing a calibration scale.

2. Apparatus for measuring absolute wavelength according to claim 1 wherein
    said diffraction grating has predetermined variations in the characteristics of its grating lines, such as length, width, phase and the like.

3. Apparatus for measuring absolute wavelength according to claim 2 wherein said line variations constitute different line lengths.

4. Apparatus for measuring absolute wavelength according to claim 2 wherein said line variations constitute different line widths.

5. Apparatus for measuring absolute wavelength according to claim 1 wherein
    the grating lines on said diffraction grating are spaced to provide a calibration scale in a whole number of angstroms at said imaging means.

6. Apparatus for measuring absolute wavelength according to claim 1 which comprises
    means for masking some of the grating lines on said diffraction grating.

7. Apparatus for measuring absolute wavelength according to claim 1 wherein
    said diffraction grating has grating lines with different spacings on different areas thereof.

8. Apparatus for measuring absolute wavelength according to claim 1 wherein
    both sources of radiation traverse a common path through at least a portion of their travel.

9. Apparatus for measuring absolute wavelength according to claim 1 wherein
    said diffraction grating constitutes a holographic grating.

10. Apparatus for measuring absolute wavelength according to claim 9 wherein
    said holographic grating includes indicia for presentation on said imaging means.

11. The method of measuring the absolute wavelength of a source of unknown frequency radiation which comprises the steps of
    positioning a diffraction grating in the path of radiation from the unknown source,
    imaging radiation dispersed from the diffraction grating, and
    directing a source of known frequency radiation against the diffraction grating to provide a wavelength calibration scale superimposed on the imaged radiation source of unknown frequency.

12. A diffraction grating which comprises
    a plate, and
    means forming a plurality of grooves on said plate in a predetermined pattern so as to produce a divided wavelength scale when illuminated by a reference source of radiation,
said predetermined pattern including grooves with a periodic variation in groove characteristics.

13. A diffraction grating according to claim 12 wherein
    said variation constitutes a variation in groove length at decimal intervals.

* * * * *